Oct. 16, 1951   J. MERCIER   2,571,154
SERVO PRESSURE REGULATOR VALVE
Filed Oct. 30, 1944
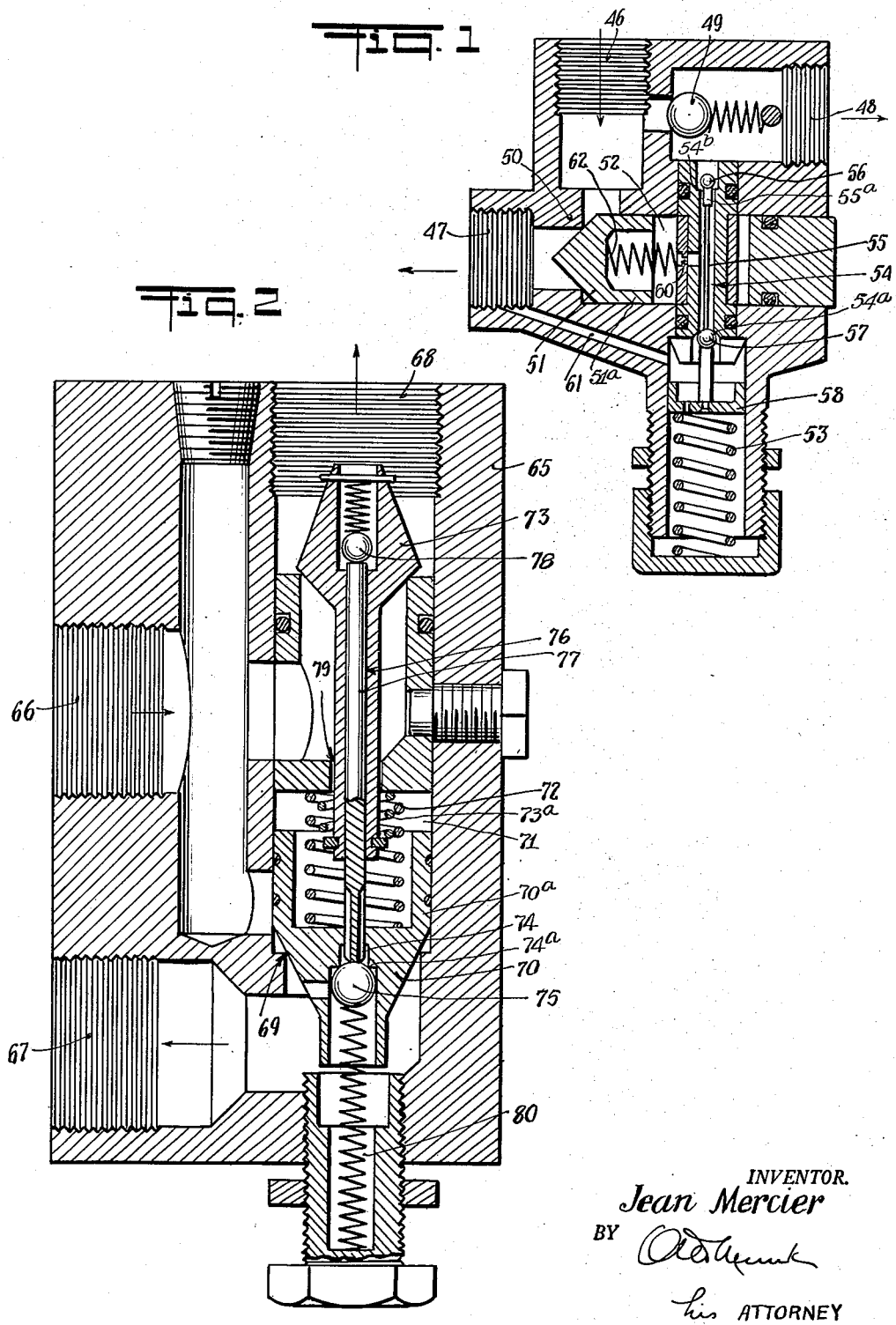
INVENTOR.
Jean Mercier
BY
his ATTORNEY Patented Oct. 16, 1951

2,571,154

UNITED STATES PATENT OFFICE 2,571,154

SERVO PRESSURE REGULATOR VALVE

Jean Mercier, New York, N. Y.

Application October 30, 1944, Serial No. 560,998

1 Claim. (Cl. 137—53)

My invention relates to unloader valves for servo-pressure regulators.

One object of the invention is to produce unloader valves which open and close with great precision under elimination of all mechanical friction.

Another object of the invention is to produce unloader valves which are operated exclusively by the pressure in the supply line but which are controlled by the pressure in the utilization line so that while the main valve and the pilot valve are opened and kept open, the pressure in the utilization line may remain unchanged at its maximum value, thus permitting the omission of the hydraulic accumulator, if desired.

I accomplish this and other objects which will appear more clearly as the specification proceeds, by the arrangement and combination of parts and elements set forth in the following detailed description, defined in the appended claim and illustratively exemplified in the accompanying drawings, in which Figs. 1 and 2 are sectional views of two embodiments of an unloader valve construction according to the invention.

Referring now to the drawings, in Fig. 1 the valve comprises a casing with three ports, that is, the supply port 46, the return port 47, and the utilization port 48. A check valve 49 prevents back flow from the utilization port 48 to the supply port 46.

The principal valve means include a seat 50, a main valve body 51 having a plunger portion 51ª, a plunger chamber 52, and a spring 62.

The pilot valve means include a tubular pilot valve chamber 54 provided in the pilot casing 45 at right angles to the axis of the main valve and opening at one end into the utilization port 48 rearwardly of the check valve 49, and at its other end into a space which communicates through a passage 61 with the exhaust port 47. A pilot valve seat 54ª is formed at said other end of the pilot valve chamber 54. A pilot valve 57 is urged against said pilot valve seat 54ª from the outside by means of a plunger 58 loaded by a spring 53. At its end opening into the utilization port 48 the pilot valve chamber 54 is provided with an auxiliary valve seat 54ᵇ. An elongated rod 55 rests with its lower end on the pilot valve 57 and traverses the pilot valve chamber 54 in axial direction with considerable clearance, and is provided at its end adjacent the auxiliary valve seat 54ᵇ with a piston-like portion 55ª, which normally projects slightly from the valve seat 54ᵇ. An auxiliary valve body 56 is supported on the piston-like portion 55ª outside of the valve seat 54ᵇ. The part of the pilot valve chamber 54 traversed by the rod 55 communicates with the plunger chamber 52 through a restricted passage 60.

In the device shown in Fig. 1, the pilot pressure room is formed by the plunger chamber 52, the passage 60 and the pilot valve chamber 54. As long as the pressure in this chamber is below the predetermined limit, the pilot valve 57 and the main valve 51 remain closed. When the pressure in the inlet port 46 and utilization port 48 exceeds the predetermined limit this excess pressure is transmitted past the auxiliary valve 56, the piston portion 55ª and the rod 55 into the pilot valve chamber 54 and to the pilot valve 57, thus causing downward displacement of the latter. When the pilot valve 57 opens, the auxiliary valve 56 closes, and from now on transmits the pressure prevailing in the utilization port 48 to the spring 53, thus keeping the pilot valve open as long as this pressure exceeds the predetermined maximum. The opening of the pilot valve 57 permits the outflow of pressure fluid from the plunger chamber 52, and a consequent opening of the valve 51 under the pressure existing in the inlet port 46. When the valve 51 opens the pressure in the inlet port 46 drops and the check valve 49 closes. Thus, regardless of pressure variations in the inlet port 46, the pilot valve 57 will remain open until the pressure in the utilization port 48 and in the line connected therewith falls below the predetermined limit.

In Fig. 2, the casing 65 has a supply port 66, a return port 67, and a utilization port 68. The principal valve means include a seat 69, a main valve body 70, including the plunger portion 70ª, a plunger chamber 71, and a spring 72. A check valve 73 controlled by a spring 73ª prevents back flow from port 68 into supply port 66.

The pilot valve means include a pilot valve seat 74ª formed in the main valve body 74, and a pilot ball valve 75 loaded by a spring 80. A rod 77 extends axially through the main valve 70 and plunger chamber 71, and passes slidably through an axial bore 76 in the stem of the check valve 73. A spring pressed ball 78 is seated on the upper end of the rod 77. The plunger chamber 71 communicates with the inlet port 66 through leak passage 79 surrounding the stem of the check valve 73. The operation of the valve according to Fig. 2 in which the pilot pressure room is practically identical with the plunger chamber 71 is in all essentials similar to that of the valve shown in Fig. 1, with the exception that in the valve according to Fig. 2, the pressure fluid passes directly from the inlet port 66 through the passage 79 into the plunger chamber 71, and this passage 79 is not closed when the pilot valve 75 opens.

I claim:

An unloader valve comprising a valve casing provided with an inlet port, a utilization port, and an exhaust port, a check valve between said inlet and utilization ports to open and to permit the flow of pressure fluid from said inlet port to said utilization port at a pressure below a predetermined unloading pressure, a main valve including a valve seat between said inlet and exhaust ports and a valve body normally urged upon said seat from the inlet side thereof and acted upon by the pressure prevailing in said inlet port in the direction of opening said valve, a plunger chamber provided in said valve casing coaxially with said valve seat, a plunger element forming an integral part of said valve body and fitting slidably in said plunger chamber, said plunger element being acted upon by the pressure prevailing in said plunger chamber to oppose opening of said valve, a tubular pilot valve chamber provided in said valve casing and opening at one end thereof into said utilization port rearwardly of said check valve and at its other end into a space in communication with said exhaust port, a pilot valve seat formed at said other end of said pilot valve chamber, a pilot valve cooperating with said pilot valve seat to close said pilot valve chamber from the outside, a spring holding said pilot valve on its seat unless the pressure in said pilot valve chamber exceeds said predetermined unloading pressure, an auxiliary valve seat at said first end of said pilot valve chamber, an elongated rod traversing said pilot valve chamber in axial direction with at least a slight clearance adjacent said first end and with considerable clearance at the other end of said pilot valve chamber, one end of said rod resting against said pilot valve and its other end projecting, in closed position of said pilot valve, from said first end of said pilot valve chamber and supporting an auxiliary valve body adapted to cooperate with said auxiliary valve seat when said pilot valve opens and to transmit to said spring the pressure prevailing in said utilization port regardless of the pressure drop resulting in said pilot valve chamber from the opening of said pilot valve, and a restricted passage connecting said plunger chamber with the part of said pilot valve chamber traversed with considerable clearance by said rod.

JEAN MERCIER.

REFERENCES CITED

The following references are of record in the file of this patent:

UNITED STATES PATENTS

| Number | Name | Date |
|---|---|---|
| 221,194 | Scovell | Nov. 4, 1879 |
| 534,514 | Mellin | Feb. 19, 1895 |
| 738,161 | Christensen | Sept. 8, 1903 |
| 1,056,562 | Lombard | Mar. 18, 1913 |
| 1,110,567 | McAulay | Sept. 15, 1914 |
| 1,991,227 | Proctor | Feb. 12, 1935 |
| 2,114,760 | Briggs | Apr. 19, 1938 |
| 2,397,117 | Ashton | Mar. 26, 1946 |
| 2,404,102 | Schultz | July 16, 1946 |
| 2,447,820 | Schultz | Aug. 24, 1948 |

FOREIGN PATENTS

| Number | Country | Date |
|---|---|---|
| 10,548 | Germany | of 1880 |